United States Patent
Hoy-Petersen et al.

(10) Patent No.: US 9,157,360 B2
(45) Date of Patent: Oct. 13, 2015

(54) METHODS AND DEVICE FOR LOW CONTAMINATION ENERGY GENERATION

(75) Inventors: Nils Christian Hoy-Petersen, Haslum (NO); Aharon M. Eyal, Jerusalem (IL); Riki Canari, Mobile Post Judean Hills (IL)

(73) Assignee: Clean Marine AS, Bergen (NO)

( * ) Notice: Subject to any disclaimer, the term of this patent is extended or adjusted under 35 U.S.C. 154(b) by 1128 days.

(21) Appl. No.: 13/142,031

(22) PCT Filed: Nov. 23, 2009

(86) PCT No.: PCT/IL2009/001100
§ 371 (c)(1),
(2), (4) Date: Nov. 1, 2011

(87) PCT Pub. No.: WO2010/073240
PCT Pub. Date: Jul. 1, 2010

(65) Prior Publication Data
US 2012/0036832 A1    Feb. 16, 2012

(30) Foreign Application Priority Data
Dec. 28, 2008    (IL) .......................................... 196231

(51) Int. Cl.
*F01N 3/00*    (2006.01)
*F01N 13/00*    (2010.01)
(Continued)

(52) U.S. Cl.
CPC .............. *F01N 13/004* (2013.01); *B01D 45/12* (2013.01); *B01D 47/06* (2013.01); *B01D 50/004* (2013.01);
(Continued)

(58) Field of Classification Search
CPC ......... F01N 3/04; F01N 3/037; F01N 13/004; B01D 45/12; B01D 50/004; B01D 47/00; B01D 47/06; F02M 25/074; F02M 25/0743; Y02T 10/20; Y02T 10/121; Y02T 10/146
USPC .................... 60/274, 278, 279, 280, 297, 311
See application file for complete search history.

(56) References Cited

U.S. PATENT DOCUMENTS 3,774,399 A    11/1973    Nohira et al.
3,826,067 A *   7/1974    Wilder et al. .................. 55/524
(Continued)

FOREIGN PATENT DOCUMENTS

DE            3118739 A1     2/1983
DE      202007005986 U1    10/2008

OTHER PUBLICATIONS

International Search Report from corresponding PCT Application No. PCT/IL2009/001100, mailed Mar. 30, 2010, 3 pages.

*Primary Examiner* — Thomas Denion
*Assistant Examiner* — Diem Tran
(74) *Attorney, Agent, or Firm* — Fish & Richardson P.C.

(57) ABSTRACT

A method for low-contamination generation of energy comprising: (a) forming a gas mixture by mixing a treated gaseous effluent stream and air; (b) introducing the gas mixture and fuel at a given gas to fuel ratio into at least one diesel engine (3); (c) burning the fuel in the diesel engine to generate energy and a flue gas stream comprising particulate matter (PM), and nitrogen oxides (NOx); (d) treating at least a portion of the flue gas stream with an aqueous stream in a cyclone unit (27) comprising a housing defined by a cylindrical peripheral wall (2) and provided with at least one inlet opening (10) for receiving flue gas and at least one inlet opening for receiving fluids thereinto and with at least one swirling means, whereby a treated gaseous effluent stream and an aqueous effluent stream are formed; (e) emitting a portion of the treated gaseous effluent stream to form an emitted portion; (f) using a portion of the treated gaseous effluent stream to form the gas mixture, and (g) repeating steps (a) through (f) multiple times.

33 Claims, 4 Drawing Sheets

(51) Int. Cl.
*B01D 45/12* (2006.01)
*B01D 47/06* (2006.01)
*B01D 50/00* (2006.01)
*F01N 3/037* (2006.01)
*F01N 3/04* (2006.01)
*F02B 29/04* (2006.01)
*F02M 25/07* (2006.01)

(52) U.S. Cl.
CPC  *F01N 3/037* (2013.01); *F01N 3/04* (2013.01); *F02B 29/0437* (2013.01); *F02M 25/074* (2013.01); *F02M 25/0743* (2013.01); *Y02T 10/121* (2013.01); *Y02T 10/146* (2013.01); *Y02T 10/20* (2013.01)

(56) References Cited

U.S. PATENT DOCUMENTS

| | | | |
|---|---|---|---|
| 3,960,528 | A * | 6/1976 | Jacobs et al. ............ 55/346 |
| 6,379,411 | B1 | 4/2002 | Turner et al. |
| 2003/0116123 | A1 | 6/2003 | Ito et al. |
| 2007/0039598 | A1 | 2/2007 | Wakayama et al. |
| 2008/0028757 | A1 | 2/2008 | Eitel et al. |

* cited by examiner

METHODS AND DEVICE FOR LOW CONTAMINATION ENERGY GENERATION

This application is the National Stage of International Application No. PCT/IL2009/001100 filed on Nov. 23, 2009, which claims the benefit of Israeli Patent Application No. 196,231, filed on Dec. 28, 2008, both of which are incorporated herein by reference in their entirety.

FIELD OF THE INVENTION

This invention relates, inter alia, to low-contamination energy generation methods and devices for effecting the same. The methods and devices are useful for removal and/or destruction of diesel engine exhaust pollutants such as particulate matter, nitrogen oxides and sulfur oxides.

BACKGROUND OF THE INVENTION

Diesel engines emit flue gas, which is released to the atmosphere. The flue gas contains pollutants, which include particulate matter (PM) comprising, among others, soot, ash, organic compounds and in many cases sulphur compounds. Sulphur compounds concentration in the flue gas is correlated with the concentration of sulphur compounds in the fuel, typically measured as the sulphur (S) content in the fuel. Fuels differ in their S content from low sulphur ones containing less than 100 ppm S to high sulphur ones containing more than 4% S. The flue gas from burning high S fuels is also high in gaseous sulphur oxides with various S to O ratios, mainly $SO_2$, collectively referred to as $SO_x$. Other undesired gaseous components of the emitted flue gas are nitrogen oxides with various N to O ratios, collectively referred to as $NO_x$.

Large diesel engines operate in both stationary and mobile power generation units. Among the mobile ones, of particular importance are diesel engines operating on board ships and marine oil exploration vessels, also referred to as marine diesel engines. Typically, a ship has in its engine room one or more engines for propulsion purposes (ranging from 4,000 kW to 60,000 kW) and two to four sets of auxiliary engines for electrical power generation or other specific utility purposes. The auxiliary engines typically have a rated power of 500 kW to 1,500 kW). Under normal sea passage, the utilization of the propulsion engines will be between 80% and 85% of MCR (Maximal Continuous Rating) and the required electric power generation will be between 400 kW and 600 kW. Typical marine oil exploration units have several large diesel engines all producing electrical power for propulsion and auxiliary purposes.

Marine diesel engines possess the capability for utilization of high quality fuels (e.g. distillates such as DMA, DMB and DMC according to ISO 8217). Such fuels are quite expensive. Therefore, typically much coarser (lower quality) fuels are utilized. An example of such coarser oil is the heavy fuel oil (HFO), e.g. of ISO 8217 grade characterized by high viscosity, density, carbon, ash and sulphur. The amount of contaminants generated in operating an engine is dependent upon various parameters; such as the type and origin of the fuel, the ambient conditions, the size and speed of the engine, the lubrication system and lubricant consumption, the operating load and the state of maintenance. The term content or amount, when in reference to a contaminating material, may mean its concentration in the effluents, e.g. expressed as weight per weight (w/w), weight per volume (w/v) or volume per volume (v/v). This term may also refer to the amount produced per time of operation (e.g. gram per hour, g/h) or per energy provided (e.g. gram per kilowatt hour, g/kWh). Typically, the flue gas formed when HFO is used in marine diesel engines contains between 1.0 g/kWh and 2.0 g/kWh PM, between 500 ppm and 1,000 ppm $SO_x$ and between 8 g/kWh and 17 g/kWh $NO_x$. Higher or lower contents are also found, depending upon the above-listed parameters.

Various methods have been described for minimizing PM, $SO_x$ and $NO_x$ emissions. Recent patent applications describe $SO_x$ removal using a cyclone unit (Israel specification 177901) and PM removal using a cyclone unit (Israel specification 194614).

It is known that recycling of effluent gas, via mixing with the air prior to engine intake, reduces NO formation. Systems using such recycling are implemented in trucks and are referred to as exhaust gas recycle (EGR) systems. Engine modification to incorporate an EGR results in heat absorption by exhaust gas components ($CO_2$) and less $O_2$ density, which contributes to a lower cylinder temperature and reduces $NO_x$ formation.

Operating EGR systems for marine diesel engines presents complications related to the impurities in the flue gas formed when burning marine fuels (ISO 8217 grades). PM and $SO_x$ present a risk for fouling and corrosion of the turbo charger, of the air cooler and of the scavenging systems employed in marine diesel engines.

Thus, the presence of high levels of PM and $SO_x$ negatively impact various engine components, for example, in the turbocharger, where high temperature and corrosion might damage the rotor, rotor shaft and housing.

Similarly, the air cooler is negatively impacted by the presence of high levels of PM and $SO_x$ resulting in corrosion.

Reduction of PM and $SO_x$ content in the exhaust gas to be recycled is therefore essential and its accomplishment at an acceptable cost presents a major challenge. In addition, while methods for reduction of PM and $SO_x$ content are known, they typically fail to totally eliminate those components. The yield of actual elimination is reported in terms of overall percentage. Yet, PM in the exhaust gas differs in size, as well as in chemical composition, chemical properties and physical properties. The yields associated with their removal depend upon such properties and on the method employed for removal. As a result, exhaust gas is enriched in some PM compared with other. PM remaining in the treated gas recycled to EGR systems may be more problematic for the EGR system than the PM removed by existing methods and the same situation may arise with regards to the various types of $SO_x$ in the gas. Therefore the prior art does not provide a teaching as to the effect of removal of PM by the prior art methods on the ability of the remaining gas to be used for recycling.

There is therefore a need for improved methods of treating flue gases to enable better removal of impurities, such as PM, $SO_x$ and $NO_x$ and for the reduction of related costs.

SUMMARY OF THE INVENTION

According to a first aspect, the present invention provides a method for low-contamination generation of energy comprising:

(a) forming a gas mixture by mixing a treated gaseous effluent stream and air;

(b) introducing said gas mixture and fuel at a given gas to fuel ratio into at least one diesel engine;

(c) burning said fuel in said diesel engine to generate energy and a flue gas stream comprising particulate matter (PM), and nitrogen oxides (NOx);

(d) treating at least a portion of said flue gas stream with an aqueous stream in a cyclone unit comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said flue gas stream inside said cyclone unit is between 20 m/sec and 120 m/sec, whereby a treated gaseous effluent stream and an aqueous effluent stream are formed;

(e) emitting a portion of said treated gaseous effluent stream to form an emitted portion;

(f) using a portion of said treated gaseous effluent stream to form said gas mixture, and (g) repeating steps (a) through (f) multiple times;

whereby said emitted portion has reduced PM, and reduced NOx content when compared with a reference gaseous effluent stream formed by standard burning of the same fuel in an identical engine to which air and fuel are provided in the same given gas to fuel ratio as above. In some embodiments, the method is a method of low-contamination generation of energy from heavy fuel oil (HFO).

The invention provides, in some embodiments, a device for low contamination generation of energy from fuel comprising:

(a) at least one diesel engine, which burns fuel and concurrently generates a flue gas;

(b) a cyclone unit for treating said flue gas, operationally connected thereto, said cyclone unit comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said flue gas stream inside said cyclone unit is between 20 m/sec and 120 m/sec preferably between 60-100 m/sec and whereby treating said flue gas generates a treated gaseous effluent stream and a aqueous effluent stream;

(c) a mixer which mixes said treated gaseous effluent stream and air to form a gas mixture; and (d) a shunt for directing said gas mixture to said diesel engine.

The invention further provides in some embodiments, a method for low-contamination generation of energy from fuel comprising (a) providing a device comprising:
  at least one diesel engine which burns fuel and concurrently generates a flue gas;
  a cyclone unit for treating said flue gas, operationally connected thereto, said cyclone unit comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said flue gas stream inside said cyclone unit is between 20 m/sec and 120 m/sec preferably between 60-100 m/sec and whereby treating said flue gas generates a treated gaseous effluent stream and an aqueous stream;
  a mixer for mixing said treated gaseous effluent stream with air to form a gas mixture; and
  a shunt for directing said gas mixture to said diesel engine.

(b) forming a gas mixture by mixing a treated gaseous effluent stream and air in said mixer;

(c) introducing said gas mixture and fuel in a given gas to fuel ratio to said at least one diesel engine;

(d) burning said fuel in said engine to generate energy and a flue gas stream comprising particulate matter (PM), and nitrogen oxides (NOx);

(e) treating at least a portion of said flue gas stream in said cyclone unit whereby a treated gaseous effluent stream is formed;

(f) emitting a first portion of said treated gaseous effluent stream to form an emitted portion;

(g) using a portion of said treated gaseous effluent stream to form said gas mixture wherein said treated gaseous effluent stream forms between 10% and 40% by volume of said mixture; and (h) repeating steps (a) through (g) multiple times;

whereby said emitted portion has reduced PM, and reduced NOx content when compared with a reference gaseous effluent stream formed by standard burning of the same fuel in an identical engine to which air and fuel are provided in the same given gas to fuel ratio as above.

The invention provides, in some embodiments, methods and devices for the low-contamination generation of energy from fuel.

In some embodiments, the invention is directed to methods and/or devices for energy generation from diesel fuel. In some embodiments, the methods and/or device are directed in particular to low-contamination generation of energy via such methods and devices. By reference to the term "low-contamination", it is to be understood that the methods of this invention significantly reduce concentration of sulphur oxides to be less than 500 ppm and nitrogen oxides to be significantly less than 9 grams per kilowatt hour. In some embodiments, the term "significantly" is to be understood to refer to statistically significant reduction.

In some embodiments, the invention surprisingly allows for low contamination energy generation methods and/or devices, which produce between 0.2 g/kWh and 0.5 g/kWh PM, between 50 ppm and 100 ppm $SO_x$, and between 3 g/kWh and 8 g/kWh $NO_x$, respectively.

In some embodiments, the methods of this invention comprise burning the fuel in a diesel engine to generate energy and a flue gas stream comprising particulate matter (PM), nitrogen oxides ($NO_x$) and sulphur oxides ($SO_x$).

In some embodiments, the diesel engine is a turbo-charged, marine diesel engine. It is to be understood that any appropriate diesel engine may be utilized, for example as described in U.S. Pat. Nos. 4,760,702; 4,719,756; 4,167,857; and others, as will be appreciated by the skilled artisan.

In some embodiments, the invention provides a method for low-contamination generation of energy from heavy fuel oil (HFO) comprising (a) forming a gas mixture by mixing treated effluent stream and air; (b) providing said gas mixture and HFO in w/w ratio in the range between 20:1 and 75:1 to at least one diesel engine; (c) burning said HFO in said engine to generate energy and a flue gas stream comprising particulate matter (PM) and nitrogen oxides ($NO_x$); (d) treating at least a portion of said flue gas stream in a cyclone unit comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said gaseous stream inside said cyclone unit is between 20 m/sec and 120 m/sec preferably between 60-100 m/sec, whereby a treated gaseous effluent stream is formed; (e) using a portion of said treated gaseous effluent stream to form said gas mixture and (f) emitting another portion of said treated gaseous effluent stream to form a gaseous effluent, wherein said gaseous effluent has reduced PM and reduced $NO_x$ content compared with a reference flue gas stream formed by standard burning of the same HFO in an identical engine to which air and HFO are provided in the same ratio.

In some embodiments, the engine is of two or four stroke type and the recycled treated gaseous effluent stream forms between 10% and 40% (v/v) of said gas mixture. In another embodiment, the treated stream is not filtered prior to mixing with air to form the gas mixture.

In another embodiment, $NO_x$, and PM content in the emitted portion is reduced by at least 60% and 70%, respectively, as compared to that of a reference stream. According to still another embodiment, the HFO, e.g. of ISO 8217 grade, comprises sulphur compounds. The sulphur oxides ($SO_x$) and $SO_x$ content in the emitted portion is reduced by at least 95% as compared to that of the reference stream.

In another embodiment, the diesel engine is one of a group of engines, preferably operating on board of a ship or a marine oil exploration unit, each engine of which is generating energy and a flue gas and the method further comprises combining flue gases of multiple engines or all the engines for said treating in step (d). According to a related embodiment, the unit of step (d) comprises an exhaust collecting hat element on top of the funnel and combining such flue gasses is conducted in this element.

In other embodiments, the flue gas stream generated is at a temperature in a range of between 180° C. and 300° C. and the treated gaseous effluent stream of step (d) is at a temperature in a range of between 40° C. and 60° C.

In another embodiment, during flue gas stream generation, at least a portion of the flue gas stream is treated in a cyclone unit comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said flue gas stream inside said cyclone unit is between 20 m/sec and 120 m/sec preferably between 60-100 m/sec, whereby a treated gaseous effluent stream is formed (step d). In one embodiment, the treated gaseous effluent stream and/or the mixture is further treated, before using to form said gas mixture. Such treatment comprises, in some embodiments, a step of compressing, e.g. to a pressure in a range between 1 and 3 bar. In some embodiments, the compressing is conducted at least partially by the turbo charger compressor.

In some embodiments, this invention provides a device for low-contamination generation of energy from fuel comprising:
 a. At least one diesel engine which burns fuel and concurrently generates a flue gas;
 b. a cyclone unit for treating said flue gas, operationally connected thereto, said cyclone unit comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said flue gas stream inside said cyclone unit is between 20 m/sec and 120 m/sec preferably between 60-100 m/sec and whereby treating said flue gas generates a treated gaseous effluent stream and an aqueous stream;
 c. a mixer which mixes said treated gaseous effluent stream with air to form a gas mixture; and
 d. a shunt for directing said gas mixture to said diesel engine.

In some embodiments, the device further comprises at least one of:
 a. a turbo charger;
 b. a raw flue gas collector hat operationally connected to two or more diesel engines such that flue gas steams generated by each engine is shunted to said collector hat;
 c. an exhaust fan;
 d. a clean flue gas uptake device
 e. a collecting tank for said treated gaseous stream;
 f. a unit for treating said aqueous stream; or
 g. a pumping unit supplying a water solution or sodium hydroxide to said cyclone unit.

n some embodiments, the device further comprises at least one of:
 a. a regulation device for maintaining level pressure in the collecting tank and in an engine room;
 b. a regulation device for the mixer; or
 c. a self adjusting recirculation device for said treated gaseous stream; and
 d. a regulation device for the pumping unit.

In one embodiment, the device for low-contamination generation of energy from fuel comprises: (a) a diesel engine burning a fuel in a provided gas mixture and generating energy and a flue gas; (b) a cyclone unit for treating the flue gas, comprising a housing defined by a cylindrical peripheral wall and provided with at least one inlet opening for receiving flue gas and at least one inlet opening for receiving fluids thereinto and with at least one swirling means, and wherein the cyclone unit is characterized in that the velocity of the flue gas stream inside the cyclone unit is between 20 m/sec and 120 m/sec preferably between 60-100 m/sec, whereby a treated gaseous effluent stream and an aqueous stream are formed; (c) a mixer which mixes treated gaseous stream with air to form the gas mixture and (d) a shunt for directing said gas mixture to said diesel engine.

In some embodiments, the invention provides a method for low-contamination generation of energy from fuel comprising:
 (a) providing a device comprising:
  at least one diesel engine which burns fuel and concurrently generates a flue gas;
  a cyclone unit for treating said flue gas, operationally connected thereto, said cyclone unit comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said flue gas stream inside said cyclone unit is between 20 m/sec and 120 m/sec preferably between 60-100 m/sec and whereby treating said flue gas generates a treated gaseous effluent stream and an aqueous stream;
  a mixer for mixing said treated gaseous effluent stream with air to form a gas mixture; and
  a shunt for directing said gas mixture to said diesel engine.
 (b) forming a gas mixture by mixing a treated gaseous effluent stream and air in said mixer;
 (c) introducing said gas mixture and fuel in a given gas to fuel ratio to said at least one diesel engine;
 (d) burning said fuel in said engine to generate energy and a flue gas stream comprising particulate matter (PM), and nitrogen oxides ($NO_x$);
 (e) treating at least a portion of said flue gas stream in said cyclone unit whereby a treated gaseous effluent stream is formed;
 (f) emitting a second portion of said treated stream as a gaseous effluent;
 (g) using a first portion of said treated gaseous effluent stream to form said gas mixture wherein said treated gaseous effluent stream forms between 10% and 40% by volume of said mixture; and (h) repeating steps (a) through (g) multiple times;
whereby said emitted portion has reduced PM, and reduced $NO_x$ content when compared with a reference gaseous effluent stream formed by standard burning of the same fuel in an identical engine to which air and fuel are provided in the same given ratio as above.

Methods for the treatment of flue gases are clearly necessary for the ability to better remove impurities, such as PM, $SO_x$ and $NO_x$ and for the reduction of costs associated with low-contamination energy generation methods. Of particular interest are large diesel engines, such as marine engines, particularly engines burning HFO at least in part.

In some embodiments, the phrase "particulate matter" refers to solid particles and/or particles of other condensed matter, such as liquid droplets, that generally range in size from fine particles (less than about 2.5 micrometers in diameter) to coarse particles (larger than about 2.5 micrometers in diameter), and that are environmental pollutants and/or hazardous materials. Particulate matter, such as PM-10 (fine particulates) and PM-2.5 (ultrafine particulates), is generally emitted from conventional coal- and other fuel-burning electrical power plants, and often carries heavy metals and/or cancer-causing organic compounds into the lungs of human beings and animals, thereby increasing the incidence and severity of respiratory diseases. Particulate matter includes dust, smoke, soot, ash (coal ash, fly ash and other types of ash), the non-combustible material such as that in coal and other tiny bits of solid materials that are released into, and/or move around in, the air. Ultrafine particulates are primarily nitrates and sulfates formed from $NO_x$ and $SO_x$ emissions.

The term "engine" is meant in the broad sense to include all combustors which combust fuel to provide heat, e.g., for direct or indirect conversion to mechanical or electrical energy. The term "Diesel engine" is meant to include all compression-ignition engines, for both mobile (including marine) and stationary power plants and of the two-stroke per cycle, four-stroke per cycle and rotary type engines.

The term "diesel fuel" means fuel suitable for diesel engines, including diesel fuels meeting the ASTM definition for diesel fuels or others even though they are not wholly comprised of distillates and may comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

Surprisingly, the methods of this invention allow for removal of PM and $SO_x$ from treated gaseous effluent steams to an extent and in a manner that enables recycling a portion of that treated gaseous effluent stream to the engine in an EGR mode of operation. As a result, the emitted portion of the treated gaseous effluent stream has a much reduced content of PM, $SO_x$ and $NO_x$.

In some embodiments, regulation of injection timing, load, ratio of air to treated gaseous effluent stream or a combination thereof provides a clear advantage to the devices and methods of this invention. In some embodiments, the higher the load of the engine, the greater the benefit of the methods of this invention.

In some embodiments, the exhaust temperature may be lowered using various approaches, such as by throttling, adjusting valve timing, adjusting air-fuel ratio to be less lean, externally loading the engine (e.g., by engaging clutches/etc.), by increasing an exhaust gas recirculation rate, changing combustion and/or injection timing, operating with additional late injections or exhaust gas injections, and/or various others. In one example, an oxidation catalyst may be employed upstream of the introduction of the gas mixture to the diesel engine.

According to an embodiment of the present invention, the engine is a diesel engine of two or four stroke type with a capacity in the range between 200 kW and 30,000 kW. In one embodiment, the engine is a marine diesel engine operating on board of a ship in an engine room. In some embodiments, the engine room has multiple engines. In some embodiments, the engine or multiple engines are turbocharged engines.

In one embodiment the engine burns, at least part of the time, fuel of ISO fuel standard 8217.

In one embodiment the engine burns, at least part of the time, distillate oil.

In one embodiment the engine burns, at least part of the time, MGO (Marine Gas Oil.) In some embodiments, in the devices and methods of this invention, a gas mixture formed by mixing treated gaseous effluent stream and air is introduced into the engine. In some embodiments, the air is treated prior to the mixing, e.g. by filteration (mechanically or by other systems), adding moisture, controlling the air temperature and more in some embodiments, at least a second stream is mixed with the air and the treated gaseous effluent stream to form the gas mixture introduced into the diesel engine. According to an embodiment of the invention, the treated gaseous effluent stream forms between 10% and 40% (v/v) of the gas mixture.

In one embodiment, the given ratio at which the gas mixture and fuel are introduced into a diesel fuel engine is between 20:1 and 75:1, preferably 30:1 and 50:1 w/w.

The operation of the engine according to the present invention produces flue gas comprising PM, NOx and in most cases also SOx. Typical operation of a marine diesel engine according to the present invention generates flue gas at a rate of 3,000-100,000 Normal meter $(Nm)^3$/hour. Typically the PM, SOx and NOx content of the emitted portion and of the treated gaseous effluent stream formed according to the present invention are less than 0.5 g/kWh, less than 100 ppm, and less than 8 g/kWh, respectively.

According to other preferred embodiments, flue gas stream generated in step (c) is at a temperature in a range of between 180 and 300° C.

The flue gas formed following burning a fuel in the diesel engine [step (c)] is treated at least partially in a cyclone unit comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said gaseous stream inside said cyclone unit is between 20 m/sec and 120 m/sec preferably between 60-100 m/sec whereby a treated gaseous stream is formed. In some embodiments, the cyclone unit is as described in WO 08/035,326, hereby incorporated by reference in its entirety.

In some embodiments, said swirling means comprises a plurality of vanes, the vanes being arranged regularly along a circular path, tangentially with respect thereto and passages are formed by open spaces between adjacent vanes.

According to another embodiment at least two aqueous streams are contacted with the flue gas stream whereas the location of this contact is selected from the group consisting of before, in and after the cyclone unit and combinations thereof to form the treated gaseous effluent stream and aqueous effluent stream.

In one embodiment, the aqueous stream is selected from the group consisting of water, steam, aqueous solutions, sea water, NaOH-comprising aqueous solution, waste water, bisulfite aqueous solution and basic aqueous solutions and combinations thereof.

In another embodiment, the amount of aqueous medium contacted with the flue gas stream prior to introduction into the cyclone unit is in a range between 3 and 100 grams per $Nm^3$ of the flue gas stream.

In another embodiment, the ratio between the flow of the aqueous medium contacted with the flue gas stream in the cyclone unit and flue gas stream is between 1 Kg per 1 $Nm^3$ and 2.5 Kg per 1 $Nm^3$.

In another embodiment treating is conducted in multiple cyclone units.

In another embodiment, the method further comprises the step of adjusting the used aqueous product for discharge into the sea.

In another embodiment, the adjusting comprises controlling pH, controlling temperature, controlling the turbidity, reducing the content of sulfites, sulfates, oil, odor molecules, toxic metals, particles, soot, PAH, sulfur oxides other than $SO_2$, nitrogen oxides, CO or any combination thereof.

Treatment of the flue gas forms a treated gaseous effluent stream. In one embodiment the temperature of the treated gaseous effluent stream is in a range of between 40° C. and 60° C. In another embodiment, the PM, $SO_x$ and $NO_x$ contents of the treated gaseous effluent stream and of the emitted portion formed according to the present invention are less than 0.5 g/kWh, less than 100 ppm, and less than 8 g/kWh, respectively.

In another embodiment, the engine is operating in an engine room of a ship or a marine oil exploration unit which may contain multiple engines, at least part of which are burning HFO and using for that purpose an identical or a similar gas mixture. In some embodiments, each engine produces flue gases. In one embodiment, the method of the present invention further comprises combining flue gases of multiple engines or all the engines for treatment in a cyclone as herein described [step (d)]. In one embodiment, the cyclone unit [of step (d)] comprises an exhaust collecting hat element, which facilitates combining of the gases, which may be placed, e.g. as shown in FIG. 1. In some embodiments, each engine has an exhaust pipe which extends to the funnel top. In some embodiments, the collecting hat provides a closed compartment at the funnel top in which all flue gas streams may be combined prior to be directed into the cyclone unit, for example by the operation of the fan unit within the cyclone unit. In one embodiment of the invention, the collecting hat element may comprise a hatch which allows for the by-pass of the cyclone unit, if desired.

In some embodiments, the treated gaseous effluent stream [formed in step (d)] and/or the gas mixture is further treated subsequent to or prior to introduction into the cyclone unit.

In some embodiments, such further treatment may comprise compressing the gas to a desired pressure range, which in some embodiments, is between about 1 to 3 bar.

In some embodiments, compression is accomplished, at least partially, with the aid of a turbo charger compressor, for example, as described in U.S. Pat. No. 7,437,874, US Patent Publication No. 20080022966, US Patent Publication No. 20080026651, and any suitable system as will be appreciated by the skilled artisan.

As explained above, recycling untreated flue gas is contraindicated, in particular, when recycling of flue gas from HFO combustion. Reduction of PM content is required. Systems were suggested where filtration is introduced for PM removal from flue gas to be recycled. Filtration, however, suffers many limitations including increased expense associated with such systems, poor efficiency as a consequence of filtrate accumulation on the filters, and others as understood in the art. Treatment of the flue gas according to the present invention drastically reduces its PM content. In one embodiment, the treated stream is not filtered prior to mixing with air to form the gas mixture. In some embodiments, the treated stream is filtered to further reduce the PM content, yet some of the limitations noted are ameliorated, for example filter replacement is required less frequently when employed in conjunction with the devices and/or methods of this invention.

In one embodiment of the methods of the present invention, a portion of the treated stream is used to form the gas mixture by mixing the stream with air and optionally another gas stream. According to an embodiment of the invention, multiple treated streams are formed, and such streams may comprise, for example a stream which has undergone filtration in combination with a stream which has not undergone filtration. Formation of the gas mixture may use, according to various related embodiments, one of the multiple treated streams or any combination of the same. Such combinations include using multiple treated streams at various ratios.

In one embodiment, a portion of the treated stream is emitted and is not re-circulated [as in step g]. In another embodiment, an entire treated stream following a single recycling round, is emitted, or in another embodiment, only part of such stream is emitted. Optionally, the portion to be emitted is further treated prior to emission.

The emitted portion forms the gaseous effluent in an operating engine (or multiple engines) or part of it. The term gaseous effluent, as used herein, refers to the total amount of gas stream emitted following energy generation via the methods of the present invention. The treated gaseous effluent stream according to the method of the present invention has reduced PM content, reduced NO content and reduced $SO_x$ content, as compared to a flue gas stream, which does not comprise multiple (which refers to at least two) repetitions of forming a gas mixture by mixing a gaseous effluent stream and air where at least a portion of the gaseous effluent stream has been treated in a cyclone at least once prior to introduction into the diesel engine in accordance with the methods of this invention.

In some embodiments, this invention provides for reduced PM, $NO_x$ and $SO_x$ which can be determined by simultaneous application of gas mixtures in two devices of this invention, wherein a first gas mixture comprises a gaseous effluent which has been previously treated in a cyclone unit prior to introduction into the diesel engine of the device at lease once, in comparison to a gaseous effluent which had not previously been thus treated (the latter effluent referred to herein as a reference gas effluent). In some embodiments, other than the absence of the step of pre-treatment of the reference effluent in the cyclone unit, the conditions in terms of engine composition, ratios utilized and other conditions are identical, in terms of air temperature and moisture, pressure, engine yield, etc. The methods and devices of this invention provide for marked reduction of PM, NOx, SOx or a combination thereof, when compared with a reference gaseous effluent stream formed by standard burning of the same fuel in an identical engine to which air and fuel are provided in the same given ratio as above.

In one embodiment, $NO_x$ content in the treated gaseous effluent stream of the present invention is reduced by at least 50%, more preferably at least 60%, most preferably at least 70% compared with said reference gaseous effluent stream. According to another embodiment, PM content in the treated gaseous effluent stream of the present invention is reduced by at least 60%, more preferably at least 70%, most preferably at least 80% when compared with said reference gaseous effluent stream. According to still another embodiment, $SO_x$ content in the treated gaseous effluent stream of the present invention is reduced by at least 90%, more preferably at least 95%, most preferably at least 98% when compared with said reference gaseous effluent stream.

In another embodiment, the present invention provides a device for low-contamination generation of energy from fuel comprising: (a) a diesel engine burning a fuel in a provided gas mixture and generating energy and a flue gas; (b) a cyclone unit for treating said flue gas, comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said flue gas stream inside said cyclone unit is between 20 m/sec and 120 m/sec preferably between 60-100 m/sec, whereby a treated gaseous effluent stream and an aqueous stream are formed; and (c) a mixer for mixing said treated gaseous stream with air to form said gas mixture.

According to preferred embodiments of the second aspect, said device further comprises at least one of:
 i. a turbo charger
 ii. a raw flue gas collector hat serving more than one diesel engine
 iii. an exhaust fan
 iv. a collecting tank for said treated gaseous stream with cooling
 v. a unit for treating said aqueous stream.
 vi. a pumping unit supplying sea water and, NaOH solution to said cyclone unit According to preferred embodiments of the second aspect, said device further comprises at least one of:
 a. regulation device for maintaining level pressure in said collecting tank and engine room
 b. regulation device for said mixing means
 c. a self adjusting recirculation device for said treated gaseous stream
 d. regulation device for said pumping unit The invention further provides in some embodiments, a method for low-contamination generation of energy from fuel comprising:
 a. providing a device comprising:
  at least one diesel engine which burns fuel and concurrently generates a flue gas;
  a cyclone unit for treating said flue gas, operationally connected thereto, said cyclone unit comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said flue gas stream inside said cyclone unit is between 20 m/sec and 120 m/sec preferably between 60-100 m/sec and whereby treating said flue gas generates a treated gaseous effluent stream and an aqueous stream;
  a mixer for mixing said treated gaseous effluent stream with air to form a gas mixture; and
  a shunt for directing said gas mixture to said diesel engine.
 b. forming a gas mixture by mixing a treated gaseous effluent stream and air in said mixer;
 c. providing said gas mixture and fuel in a given w/w ratio to said at least one diesel engine;
 d. burning said fuel in said engine to generate energy and a flue gas stream comprising particulate matter (PM), and nitrogen oxides ($NO_x$);
 e. treating at least a portion of said flue gas stream in said cyclone unit whereby a treated effluent stream is formed;
 f. emitting a first portion of said treated stream as a gaseous effluent;
 g. using a second portion of said treated effluent stream to form said gas mixture wherein said treated recycled effluent stream forms between 10% and 40% by volume of said mixture; and
 h. repeating steps (a) through (f) multiple times;
whereby said emitted portion has reduced PM, and reduced $NO_x$ content when compared with a reference gaseous effluent stream formed by standard burning of the same fuel in an identical engine to which air and fuel are provided in the same given ratio as above.

In some embodiments, the shunt for directing the gas mixture to the diesel engine is to be understood as any operational connectivity, which allows for the direction of the gas mixture to the diesel engine, and can comprise any physical means to accomplish such direction.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

EXAMPLES

Figure 1:
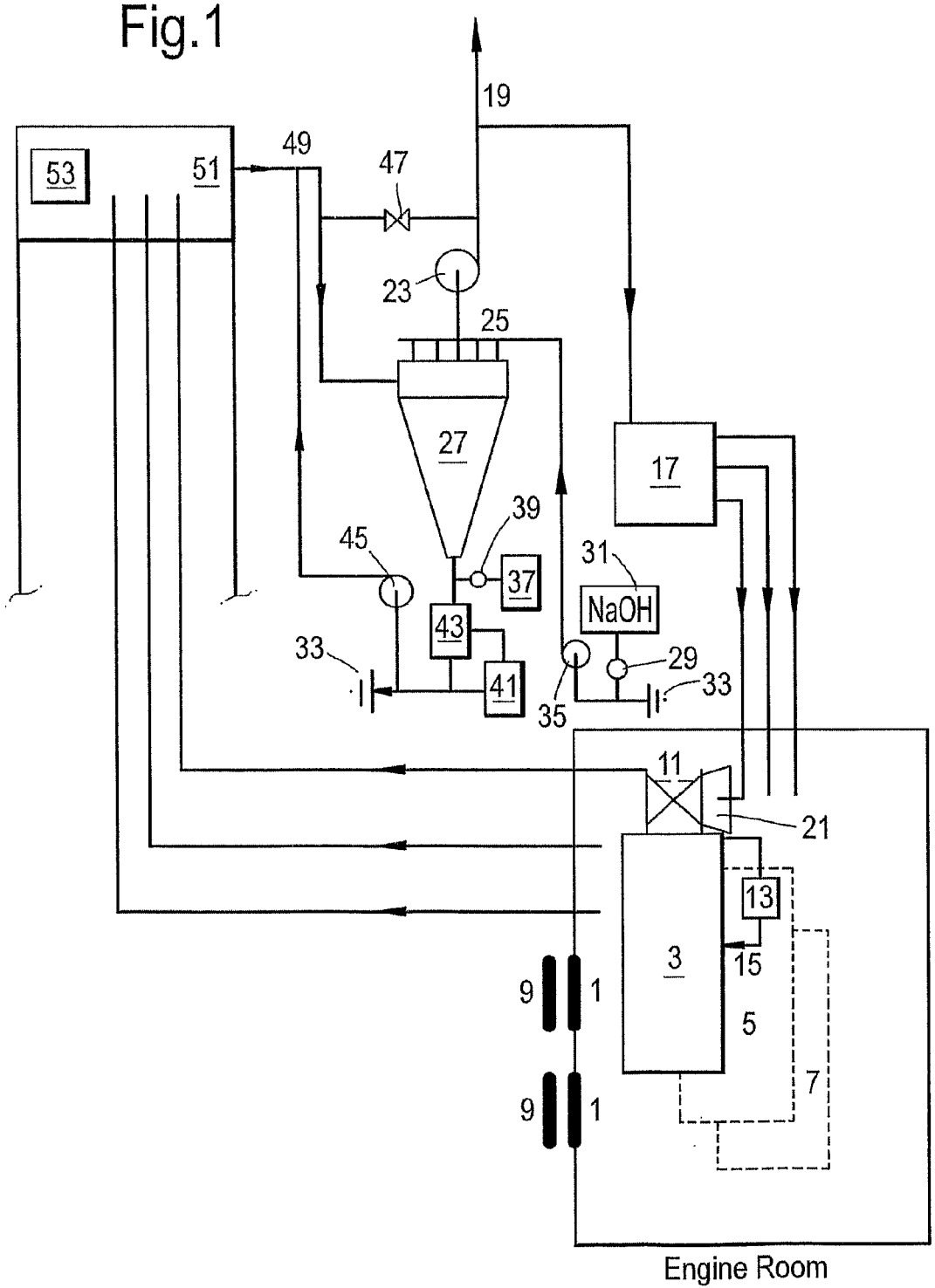
FIG. 1 schematically depicts one embodiment of the devices of this invention, indicating different modular elements of which the device is comprised.

Referring to FIG. 1, an engine room onboard a ship or oil exploration unit, is fed air through one or more fans (1) to meet the scavenging air requirements for the diesel engines (3) (5) (7) and boilers (not shown) on board such vessels. One or more fans (1) may be turned off during a period of time when the engines are not in use. Filters (9) may or may not be attached to the fan.

Air in the engine room is drawn in through coarse filter pads (9) into the turbocharger (11) where it is compressed for up to about 1-3 bars (pending engine loads). The heated compressed air is cooled by the air cooler (13) down to about 40-45° C. before accessing the cylinders of diesel engines (3) (5) and (7). The air cooler (13) relies on application of water for cooling, with the amount of water applied being sufficient to keep the scavenging air constant while ambient temperature changes. Conditions will be adjusted to accommodate engine use in different climactic conditions, for example, in ISO ambient conditions (25° C. air, 25° C. sea water, 1000 mbar) or in tropical conditions (45° C. air, 36° C. sea water, 1000 mbar), where the exhaust amount (kg/hr) and temperature differ.

Two stroke engines have a common air receiver (15) placed after the air cooler (13) from where air is drawn into each cylinder.

A Clean Flue Gas Collector (17), having a certain buffer capacity and a pressure equal to the engine room air creates a reservoir containing cleaned flue gas. As used here, "clean flue gas" may mean the treated gaseous effluent stream of the present invention. This reservoir provides a repository from which the turbocharger (11) draws a given portion in the same manner that engine room air is drawn.

A Clean Flue Gas Uptake Device (19) has a diameter such that it enables the greatest amount of flue gas supply to the engines (3) (5) and (7) and comprises a flap to regulate the pressure of such gas and actual capacity needed. (Note that when the engine load is reduced the amount of cleaned flue gas will also be reduced). The Clean Flue Gas Uptake Device (19) therefore controls the pressure inside the flue gas collector (17). The Clean Flue Gas Uptake Device is located as far as possible from the cyclone unit in order to reduce as much as possible the temperature of the treated gaseous effluent stream and the content of heavy PM contained therein.

A flue gas fan (23) keeps a constant amount of gas circulation via the cyclone unit (27) by drawing in treated gaseous effluent. The Self regulating recirculation (47) connection allows treated flue gas to re-enter the cyclone unit.

Figure 3:
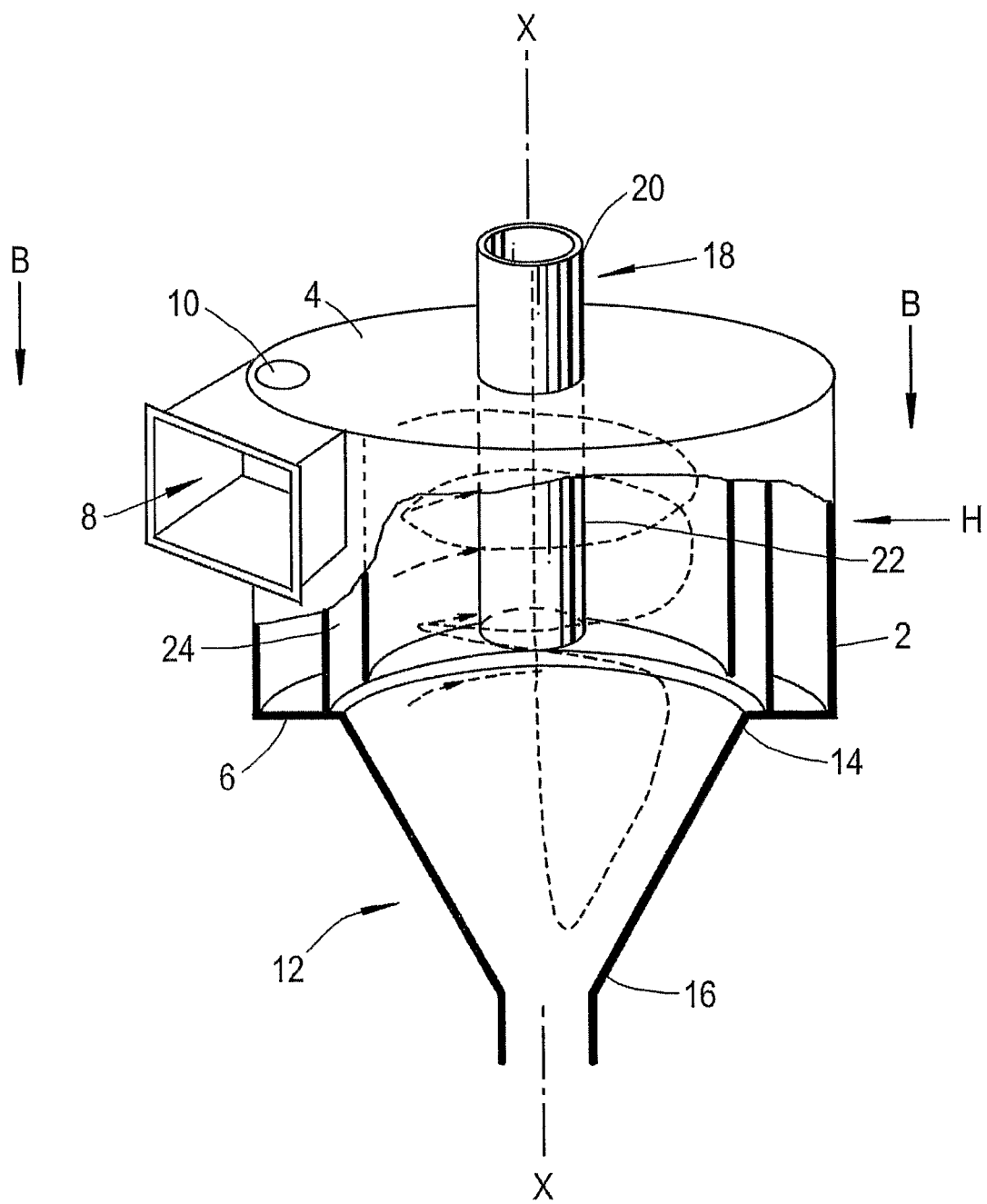
FIG. 3 depicts an embodiment of a cyclone unit.
Figure 4:
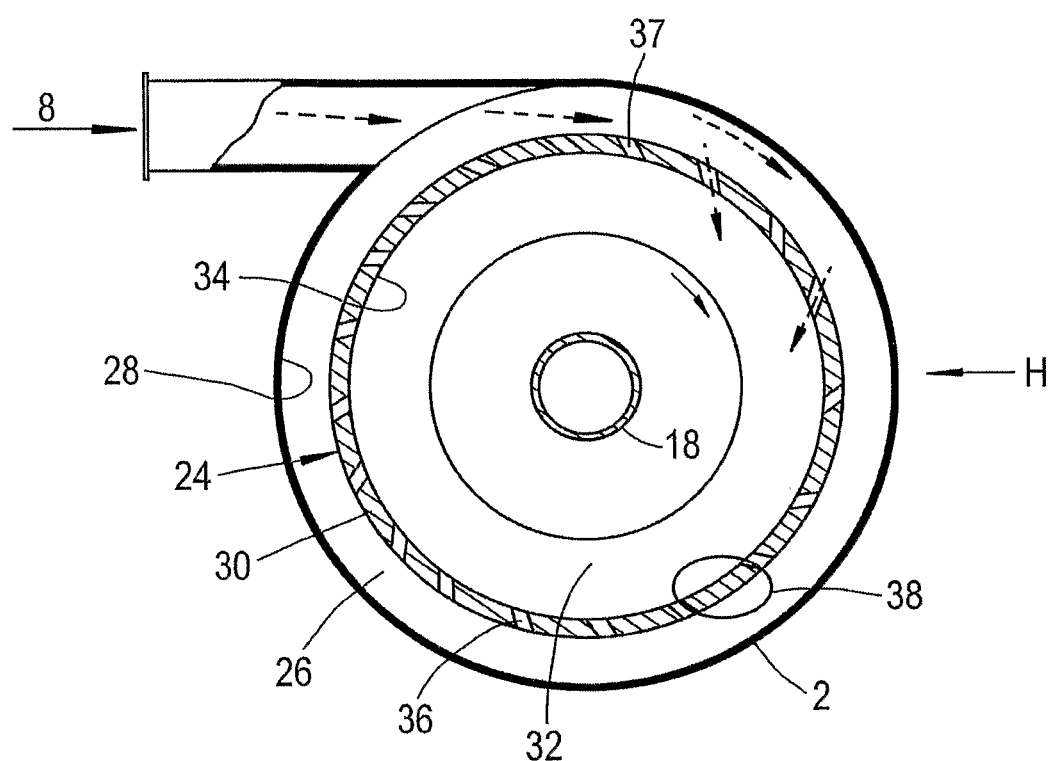
FIG. 4 depicts another embodiment of a cyclone unit.

Nozzles (25) prior to and in the cyclone unit inject aqueous media as indicated in FIGS. 3 and 4. In one embodiment the aqueous media is selected from the group consisting of water, steam, aqueous solutions, sea water, NaOH-comprising aqueous solution, waste water, bisulfite aqueous solution and basic aqueous solutions and combinations thereof. In one embodiment, sea water enters from the sea water inlet (33) and is mixed with NaOH from the NaOH tank (31) by the NaOH dosage pump (29), which constitutes the aqueous solution drawn to the nozzles (25) by the aqueous solution pressure pump (35).

In one embodiment flocculants are used for treating the used aqueous stream. Flocculants from the flocculants tank (37) are pumped by the flocculants dosage pump (39) and mixed with the used aqueous stream from the cyclone unit (27) to remove suspended matter contained in it at the flocculants skimmer Tank (43) and then collected at the PM filter Bag (41) before discharging.

In same embodiments high press pre injection pump (45) route part of the aqueous media to the Pre injection nozzle (49) that inject it to the flue gas prior to the entrance to the cyclone unit.

A raw flue gas collecting hat (51) gathers the flue gas that forms in any individual diesel engine (3) (5) and (7) for further treatment. The raw flue gas hat (51) has a by-pass hatch (53).

In some embodiments, contrary to the several advanced valves necessary for regulating exhaust in an EGR application for trucks and smaller engines, by having neutralized any pressure difference via the Flue Gas Uptake device (19), simpler regulating devices are sufficient.

In preferred embodiments, a Clean Flue Gas Uptake device (19) is used for taking a portion of said treated gaseous effluent stream after the treatment in said cyclone unit (27). Said Uptake device is located as far as possible from the cyclone unit (closer to the atmosphere) in order to let the treated gaseous effluent stream become colder as much as possible. In addition to the cooling taking said portion from the pipe line as far as possible from the cyclone unit reduces the content of the large PM in said treated gaseous effluent stream.

In some embodiments, the device comprises an Air and Clean Gas mixer (21) (see FIG. 2) suitable for use with a large turbocharger appropriate for use with two stroke main engines. The turbocharger draws air from the side toward the center and into the compressor wheel.

In some embodiments, the device further comprises a cover extending over a certain segment of the air inlet house, allowing for an easy retrofit and adaptive solution for existing turbochargers to be adapted for incorporation into the devices of this invention.

Figure 2:
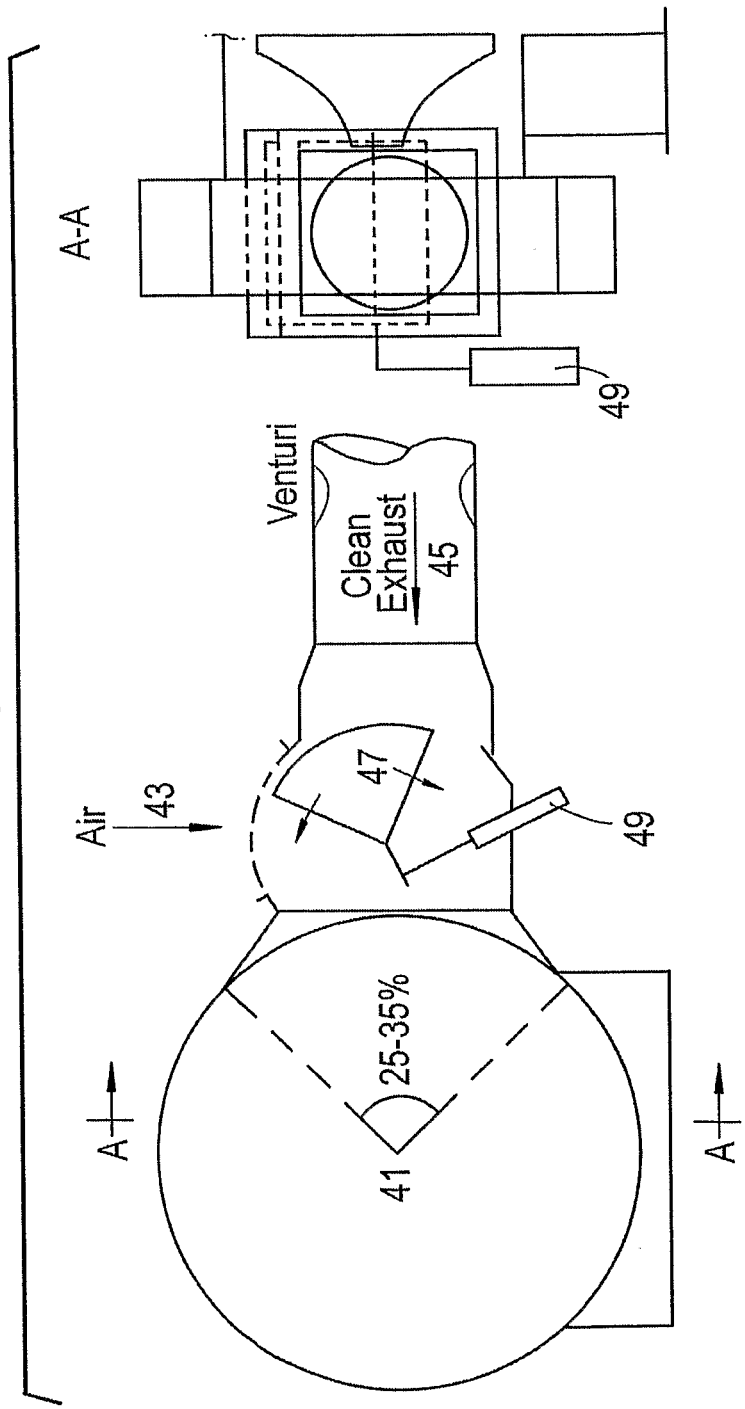
FIG. 2 depicts an embodiment of a mixer for mixing air and a treated gaseous effluent stream.

Referring to FIG. 2, depicting an embodiment of a mixer (41) for mixing entering air via the inlet (43) and a treated gaseous effluent stream entering via the inlet (45), the mixer comprises a retractable cone (47), which provides for free passage of air (retracted) or no passage (extended) with fine tuning (in-between) and with minimum turbulence. In some embodiments, the mixer may comprise other comparable elements, such as a flap or sliding device (49) to comparably regulate air passage. The air volume may be measured by a calibrated venturi in the pipeline from the collector, which in turn may also comprise a mechanism, such as a closing butterfly valve, for regulating air flow, when the engine is off. In some embodiments, movement of the cone may be accomplished via matching input from the engines governor (engine load) and the venturi (flow device). A predefined combination may govern the regulation.

In some embodiments, the scavenging air temperature after the cooler and the engine fuel oil injection timing may be adjusted.

Referring to FIGS. 3 and 4, an embodiment of a cyclone unit for use according to the present invention is provided. The unit may comprise a housing (H) defined by a cylindrical peripheral wall (2) thereof and by upper (4) and lower (6) extremities, said housing having a longitudinal axis (X-X) and being provided with at least one inlet opening (8) for receiving said gaseous stream and at least one inlet opening (10) for receiving said aqueous stream thereinto. Said cyclone unit further comprises an outlet means from said housing (H) preferably formed as a hollow truncated cone (12), having a large base (14) and a spaced apart small base (16), the large base thereof being in communication with the lower extremity (6) of said housing (H). A pipe means (18) is placed within said housing (H), preferably coaxially with the longitudinal axis (X-X) wherein an uppermost extremity (20) of the pipe means (18) is located outside of the housing, and a lowermost extremity (22) of said pipe means is located within the housing.

Said cyclone unit further comprises at least one swirling means (24) being formed as a cylindrical ring and being mounted within said housing, coaxially with the longitudinal axis (X-X) so as to provide an annular space (26) between the housing central wall (28) and the peripheral wall (30) of said swirling means and to provide an inner annular space (32) between the central wall (34) of the swirling means (24) and the lowermost extremity (22) of said pipe means (18).

Said swirling means (24) are defined by a plurality of openings (36) so as to enable passage from said annular space (26) towards said inner annular space (32). Said swirling means is formed with plurality of vanes (39) said vanes being arranged regularly along a circular path, preferably tangentially with respect thereto and said plurality of openings (36) are formed by open spaces between the adjacent vanes (39).

Using the cyclone unit described above, said gaseous stream enters through at least one of said inlet openings (8) to said annular space (26) and then passes through at least one of said plurality of openings (36) and then at least one passages (37) towards said inner annular space (32), while said aqueous stream enters through at least one of said inlet openings (10) into said housing and is contacted with said gaseous stream. These two mixed streams are then caused to flow through said hollow truncated cone (12) whereas said gaseous product is exiting though said pipe means (18), while said wash solution is collected through said small base (16) of said hollow truncated cone (12) into said appropriate collecting receptacle.

The passage of said gaseous stream through said plurality of openings (36), and then passages (37) results in an unexpectedly high velocity of said gaseous stream, said velocity being between 20 m/sec-120 m/sec, and in preferred embodiments being between 60-70 m/sec. As a result a very efficient contact between said gaseous and aqueous streams is achieved. This is compared to a typical cyclone scrubber that is characterized by the ability to produce a velocity of about 15-50 m/sec.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The following claims particularly point out certain combinations and sub-combinations. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method for low-contamination generation of energy comprising:
    (a) forming a gas mixture by mixing a treated gaseous effluent stream and air;
    (b) introducing said gas mixture and fuel at a given gas to fuel ratio into at least one diesel engine;
    (c) burning said fuel in said diesel engine to generate energy and a flue gas stream comprising particulate matter (PM), and nitrogen oxides (NOx);
    (d) treating at least a portion of said flue gas stream with an aqueous stream in a cyclone unit comprising a housing defined by a cylindrical peripheral wall and provided with at least one inlet opening for receiving flue gas and at least one inlet opening for receiving fluids thereinto and with at least one swirling means, and wherein said cyclone unit is characterized in that the velocity of said flue gas stream inside said cyclone unit is between 20 m/sec and 120 msec, whereby a treated gaseous effluent stream and an aqueous effluent stream are formed;
    (e) emitting a portion of said treated gaseous effluent stream to form an emitted portion;
    (f) using a portion of said treated gaseous effluent stream to form said gas mixture, and
    (g) repeating steps (a) through (f) multiple times; whereby said emitted portion has reduced PM, and reduced NOx content when compared with a reference gaseous effluent stream formed by standard burning of the same fuel in an identical engine to which air and fuel are provided in the same given gas to fuel ratio as above.

2. The method according to claim 1, wherein said engine is a turbo-charged marine diesel engine.

3. The method according to claim 1, characterized in that said NOx content in said emitted portion is reduced by at least 50% when compared with said reference gaseous effluent stream.

4. The method according to claim 1, characterized in that said PM content in said emitted portion is reduced by at least 60% when compared with said reference gaseous effluent stream.

5. The method according to claim 1, wherein said fuel comprises sulphur compounds and wherein said flue gas stream of step (c) comprises sulphur oxides (SOx), characterized in that said SOx content in said emitted portion is reduced by at least 90% when compared with said reference gaseous effluent stream.

6. The method according to claim 1, wherein said treated gaseous effluent stream forms between 10% and 40% (v/v) of said gas mixture.

7. The method according to claim 1, wherein said portion of said treated gaseous effluent stream is not filtered prior to mixing with air to form said gas mixture.

8. The method according to claim 1, wherein said swirling means comprises a plurality of vanes, said vanes being arranged regularly along a circular path, tangentially with respect thereto and passages are formed by open spaces between adjacent vanes.

9. The method according to claim 1, wherein said treating is conducted in multiple cyclone units.

10. A method according to claim 1, wherein said aqueous effluent stream is discharged, further comprising a step of adjusting at least one of the temperature and composition of said aqueous effluent stream before discharge or simultaneously with it.

11. The method according to claim 1, wherein said flue gas stream generated in step (c) is at a temperature in a range between 180 and 3000 C.

12. The method according to claim 1, wherein said treated gaseous effluent stream of step (d) is at a temperature in a range between 40 and 600 C.

13. The method according to claim 1, wherein said treated gaseous effluent stream of step (d) is further treated for reducing moisture and temperature before using to form said gas mixture.

14. The method according to claim 1, wherein said fuel is a fuel oil.

15. The fuel according to claim 14, wherein the fuel is in accordance with ISO fuel standard 8217.

16. The method according to claim 15, wherein said fuel is a HFO.

17. The method according to claim 1, wherein at least one aqueous stream is contacted with said flue gas stream to form said treated gaseous effluent stream and an aqueous effluent stream.

18. The method according to claim 17, wherein at least one aqueous stream is contacted with said flue gas stream, prior to treating said stream in said cyclone unit and wherein the ratio between said aqueous stream and said flue gas stream is in a range between 3 and 100 gram per Nm3 of said flue gas stream.

19. The method according to claim 17, wherein at least one aqueous stream is contacted with said flue gas stream in said cyclone unit and wherein the ratio between said aqueous stream and said flue gas stream is in a range between 1 Kg per 1 Nm3 and 2.5 Kg per 1 Nm3.

20. The method according to claim 17, wherein said aqueous stream is selected from the group consisting of water, steam, aqueous solutions, sea water, NaOH-comprising aqueous solution, waste water, bisulfite aqueous solution and basic aqueous solutions and combinations thereof.

21. The method according to claim 1, wherein at least one of the temperature and composition of said portion of said treated gaseous effluent stream is adjusted prior to said emitting.

22. The method according to claim 21 wherein adjusting said portion of treated gaseous effluent stream comprises controlling at least one of the parameters selected from a group consisting of pH, temperature and reducing the content of at least one of sulfur compounds, oil, odor molecules, toxic metals, particles, soot, polycyclic aromatic hydrocarbon (PAH), nitrogen oxides and CO2.

23. The method according to claim 1, wherein said diesel engine is one of a group of engines, each of which generating energy and a flue gas, further comprising combining flue gases of multiple engines for said treating in step (d).

24. The method according to claim 23, wherein flue gases of all of said engines are combined for said treating in step (d).

25. The method according to claim 23, wherein said unit of step (d) comprises an exhaust collecting hat element, wherein said combining is conducted.

26. The method according to claim 23, wherein said group of engines operate on board of a ship.

27. The method according to claim 1, further comprising the step of compressing said gas mixture prior to introducing said mixture into said engine.

28. The method according to claim 27, wherein said compressing is to a pressure in a range between 1 bar and 3 bars.

29. The method according to claim 27, wherein said compressing is conducted at least partially by a turbo charger compressor.

30. A device for low-contamination generation of energy from fuel comprising:
(a) at least one diesel engine, which burns fuel and concurrently generates a flue gas;
(b) a cyclone unit for treating said flue gas, operationally connected thereto, said cyclone unit comprising a housing defined by a cylindrical peripheral wall and provided with at least one inlet opening for receiving flue gas and at least one inlet opening for receiving aqueous fluids thereinto and with at least one swirling means, said swirling means being formed as a cylindrical ring and being mounted within said housing, coaxially with the longitudinal axis of said housing so as to provide a first annular space between a central wall of the housing and a peripheral wall of said swirling means, and an inner second annular space, said swirling means being defined by a plurality of openings, so as to enable passage from said first annular space towards said inner second annular space, wherein said gaseous stream enters through said at least one inlet opening for receiving flue gas to said first annular space and then passes through at least one of said plurality of openings and then through at least one of said passages towards said inner annular space while an aqueous stream of said aqueous fluids enters through said at least one inlet opening for receiving aqueous fluids into said housing and is contacted with said gaseous stream and wherein said cyclone unit is characterized in that the velocity of said flue gas stream inside said cyclone unit is between 20 m/sec and 120 m/sec and whereby treating said flue gas with said aqueous fluids in said cyclone unit generates a treated gaseous effluent stream and an aqueous effluent stream;
(c) a mixer which mixes said treated gaseous effluent stream and air to form a gas mixture; and
(d) a shunt for directing said gas mixture to said diesel engine.

31. A device according to claim 30, further comprising at least one of: a. a turbo charger; b. a flue gas collector hat operationally connected to two or more diesel engines such that flue gas steams generated by each engine is shunted to said collector hat; c. an exhaust fan; d. a clean flue gas uptake device e. a collecting tank for said treated gaseous effluent stream; f. a unit for treating said aqueous effluent stream; and g. a pumping unit supplying a water solution or sodium hydroxide to said cyclone unit.

32. A device according to claim 31, further comprising at least one of:
a. a regulation device for maintaining level pressure in said collecting tank and in an engine room;
b. a regulation device for said mixer;
c. a self adjusting recirculation device for said treated gaseous stream; and
d. a regulation device for said pumping unit.

33. A method for low-contamination generation of energy from fuel comprising;
a. providing a device comprising:
at least one diesel engine which burns fuel and concurrently generates a flue gas;
a cyclone unit for treating said flue gas, operationally connected thereto, said cyclone unit comprising a housing defined by a cylindrical peripheral wall and provided with at least one inlet opening for receiving flue gas and at least one inlet opening for receiving aqueous fluids thereinto and with at least one swirling means, said swirling means being formed as a cylindrical ring and being mounted within said housing, coaxially with the longitudinal axis of said housing so as to provide a first annular space between a central wall of the housing and a peripheral wall of said swirling means, and an inner second annular space, said swirling means being defined by a plurality of openings, so as to enable passage from said first annular space towards said inner second annular space, wherein said gaseous stream enters through said at least one inlet opening for receiving flue gas to said first annular space and then passes through at least one of said plurality of openings and then through at least one of said passages towards said inner annular space while an aqueous stream of said aqueous fluids enters through said at least one inlet opening for receiving aqueous fluids into said housing and is contacted with said gaseous stream and wherein said cyclone unit is characterized in that the velocity of said flue gas stream inside said cyclone unit is between 20 m/sec and 120 m/sec and whereby treating said flue gas with said aqueous fluids in said cyclone unit generates a treated gaseous effluent stream and an aqueous stream;

a mixer for mixing said treated gaseous effluent stream with air to form a gas mixture; and a shunt for directing said gas mixture to said diesel engine.

b. forming a gas mixture by mixing a treated gaseous effluent stream and air in said mixer;

c. introducing said gas mixture and fuel in a given gas to fuel ratio to said at least one diesel engine;

d. burning said fuel in said engine to generate energy and a flue gas stream comprising particulate matter (PM), and nitrogen oxides (NOx);

e. treating at least a portion of said flue gas stream in said cyclone unit whereby a treated gaseous effluent stream is formed;

f. emitting a first portion of said treated gaseous effluent stream to form an emitted portion;

g. using a portion of said treated gaseous effluent stream to form said gas mixture wherein said treated gaseous effluent stream forms between 10% and 40% by volume of said mixture; and h. repeating steps (a) through (g) multiple times; whereby said emitted portion has reduced PM, and reduced NOx content when compared with a reference gaseous effluent stream formed by standard burning of the same fuel in an identical engine to which air and fuel are provided in the same given gas to fuel ratio as above.

* * * * *

UNITED STATES PATENT AND TRADEMARK OFFICE
CERTIFICATE OF CORRECTION

PATENT NO. : 9,157,360 B2
APPLICATION NO. : 13/142031
DATED : October 13, 2015
INVENTOR(S) : Nils Christian Hoy-Petersen et al.

It is certified that error appears in the above-identified patent and that said Letters Patent is hereby corrected as shown below:

IN THE CLAIMS

Column 16

Line 9, Claim 1, delete "msec," and insert -- m/sec, --.

Line 58, Claim 11, delete "3000 C." and insert -- 300°C. --.

Line 61, Claim 12, delete "600 C." and insert -- 60° C. --.

Column 17

Line 13, Claim 18, delete "Nm3" and insert -- $Nm^3$ --.

Line 19, Claim 19, delete "Nm3" and insert -- $Nm^3$ --.

Column 18

Line 26, Claim 31, delete "steams" and insert -- streams --.

Line 28, Claim 31, delete "device" and insert -- device; --.

Line 40, Claim 33, delete "comprising;" and insert -- comprising: --.

Column 19

Line 10, Claim 33, delete "engine." and insert -- engine; --.

Signed and Sealed this
Sixteenth Day of February, 2016

Michelle K. Lee
*Director of the United States Patent and Trademark Office*